United States Patent [19]
Diepstraten et al.

[11] Patent Number: 5,329,531
[45] Date of Patent: Jul. 12, 1994

[54] METHOD OF ACCESSING A COMMUNICATION MEDIUM

[75] Inventors: Wilhelmus J. M. Diepstraten, Diessen; Hendrik van Bokhorst, MB Nijkerk, both of Netherlands

[73] Assignee: NCR Corporation, Dayton, Ohio

[21] Appl. No.: 78,099

[22] Filed: Jun. 18, 1993

[30] Foreign Application Priority Data

Mar. 6, 1993 [GB] United Kingdom ............... 9304636

[51] Int. Cl.$^5$ ............................................. H04J 3/24
[52] U.S. Cl. .............................. 370/94.2; 370/85.3; 370/85.7; 370/95.1; 370/85.6
[58] Field of Search ............... 370/85.6, 85.1, 85.2, 370/85.3, 79.80, 85.7, 85.9, 85.11, 95.1, 95.2, 95.3, 100.1, 106.1, 110.1, 91, 92, 93, 94.1, 94.2

[56] References Cited

U.S. PATENT DOCUMENTS

| | | | |
|---|---|---|---|
| 4,987,571 | 1/1991 | Haymond et al. | 370/85.6 |
| 5,107,492 | 4/1992 | Roux et al. | 370/85.6 |
| 5,115,430 | 5/1992 | Hahne et al. | 370/85.6 |

Primary Examiner—Douglas W. Olms
Assistant Examiner—Huy D. Vu
Attorney, Agent, or Firm—Paul J. Maginot

[57] ABSTRACT

A method of accessing a communication medium allows for isochronous and asynchronous communication traffic to share the same medium and the same transceivers of a plurality of communication stations that communicate by way of a base station. The base station controls the communication between communication stations and generates regular timing periods in which isochronous traffic is sent to the stations with a higher priority than any asynchronous traffic pending at the beginning of each timing period. Once the initial isochronous traffic has accessed the medium, any further isochronous traffic retains access to the medium so that the asynchronous traffic can only occur in that part of the frame period remaining after the isochronous traffic has accessed the medium.

2 Claims, 13 Drawing Sheets

METHOD OF ACCESSING A COMMUNICATION MEDIUM

BACKGROUND OF THE INVENTION

The present invention relates to a method of accessing a communication medium.

Communication traffic between communication apparatus, such as a base station and a plurality of communication stations forming a Local Area Network (LAN), can comprise asynchronous traffic or isochronous traffic.

Asynchronous traffic exhibits unpredictable traffic timing, at which a fast burst of packets is generated, and while such traffic requires fast response times in the stations, a wide range of instantaneous packet delays can be tolerated provided the average delay in the stations is within acceptable limits. An example of asynchronous traffic communication is the communication that occurs between computer systems when a file has to be transferred relatively infrequently but at a high speed once the communication commences. A large LAN bandwidth must be available to the asynchronous traffic to allow for the fast transfer of the file.

Communication-medium access protocols that are established having regard to the above mentioned characteristics of asynchronous stations are based on a so-called Distributed Access Protocol in which the medium access procedure is shared by all the stations connected to the medium. An example of a Distributed Access Protocol is the Carrier Sense Multiple Access with Collision Detection (CSMA/CD) protocol used as part of the Ethernet and IEEE 802.3 communication protocols.

Isochronous traffic requires a predictable channel bandwidth and can tolerate a long average packet-delay in the stations provided the variations in the delays of different packets are within narrow limits. Also, isochronous packets that are not delivered within a specified delay are generally discarded. The quality of the isochronous communication depends upon the application requirements, but generally a pre-defined bandwidth is required along with a bit-error-rate limit or packet-error-rate limit. An example of isochronous traffic is so-called packetized-voice traffic. This traffic comprises voice data in the form of a steady stream of packets that needs a limited bandwidth and also a regular delay characteristic to achieve a steady packet stream for the relatively long call duration. Other examples are industrial processes that need to react to known situations or events at an accurately determinable time. Networks that can handle isochronous traffic employ so-called Connection Oriented access protocols in which a connection between the stations is established and the stations are assigned a channel with a well defined bandwidth and delay characteristic. An example of such a network is the Integrated Services Digital Network (ISDN) which employs a Time Division Multiple Access (TDMA) protocol to service multiple stations in the network.

From the above it can be seen that asynchronous and isochronous communication each have very different requirements and characteristics. Thus, when asynchronous and isochronous communication is required in the same LAN, the asynchronous packets are transferred via a different medium (i.e. cable) from the isochronous packets and different access protocols are employed on the different media. This disadvantageously increases the cost and complexity of the LAN and is particularly disadvantageously restrictive in that isochronous and asynchronous traffic cannot be readily provided in a wireless LAN where the stations have to share the same wireless medium. Such wireless LANs are being increasingly provided for devices such as notebook P.C.s or Personal Digital Assistance (PDA) devices. It would be advantageous if such devices could provide for the communication of real-time mobile packets along with data packets, and so a method of accessing a communication medium is required that provides for the sharing of the same medium by asynchronous and isochronous traffic.

SUMMARY OF THE INVENTION

In accordance with one embodiment of the present invention, there is provided a method of accessing a communication medium of a local area network for isochronous and asynchronous communication between a plurality of communication stations which communicate by way of a base station. The method includes the steps of (1) generating uniform timing periods in the base station, (2) accessing the medium each period with at least one isochronous packet from the base station with a higher access priority than any asynchronous packets pending at the commencement of each timing period, (3) delaying any asynchronous packets in each timing period until the at least one isochronous packet and any isochronous traffic transmitted in response thereto have attempted access to the medium, and (5) accessing the medium for transmission of the asynchronous packets during the remainder of each timing period.

Pursuant to another embodiment of the present invention, there is provided a method of accessing a communication medium of a local area network having a plurality of communication stations and a base station with the base station generating a uniform timing period. The method includes the steps of (1) accessing the medium during the timing period with an isochronous packet from the base station which was pending at the beginning of the timing period, (2) accessing the medium during the timing period with an asynchronous packet from the base station which was pending at the beginning of the timing period, and (3) providing a higher access priority to the isochronous packet than to the asynchronous packet.

In accordance with yet another embodiment of the present invention, there is provided an apparatus for accessing a communication medium of a local area network having a plurality of communication stations and a base station with the base station generating a uniform timing period. The apparatus includes a mechanism for accessing the medium during the timing period with an isochronous packet from the base station which was pending at the beginning of the timing period. The apparatus further includes a mechanism for accessing the medium during the timing period with an asynchronous packet from the base station which was pending at the beginning of the timing period. In addition, the apparatus includes a mechanism for providing a higher access priority to the isochronous packet than to the asynchronous packet.

Advantageously, the invention allows for asynchronous traffic and isochronous traffic to share the same wireless medium and also share the same radio transceivers in an efficient manner. In particular, the invention allows for asynchronous data packets and isochronous real-time voice packets to share the same medium and transceivers. The advantages of the present inventions are further illustrated when it is considered that, as an example, a cordless phone and notebook p.c. can share the same frequency band and the base station infrastructure.

A further advantage arises in that the packets can be provided in various lengths, and in some cases can be empty. Also, any bandwidth that is not used by the isochronous traffic, for example if an isochronous packet is empty, can be employed by the asynchronous traffic.

It is therefore an object of the present invention to provide a method of accessing a communication medium for both asynchronous and isochronous traffic.

It is another object of the present invention to provide a new and useful method of accessing a communication medium of a local area network for isochronous and asynchronous communication between a plurality of communication stations which communicate by way of a base station.

It is yet another object of the present invention to provide a new and useful method of accessing a communication medium of a local area network having a plurality of communication stations and a base station with the base station generating a uniform timing period.

It is moreover another object of the present invention to provide a new and useful apparatus for accessing a communication medium of a local area network having a plurality of communication stations and a base station with the base station generating a uniform timing period.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

Figure 1:
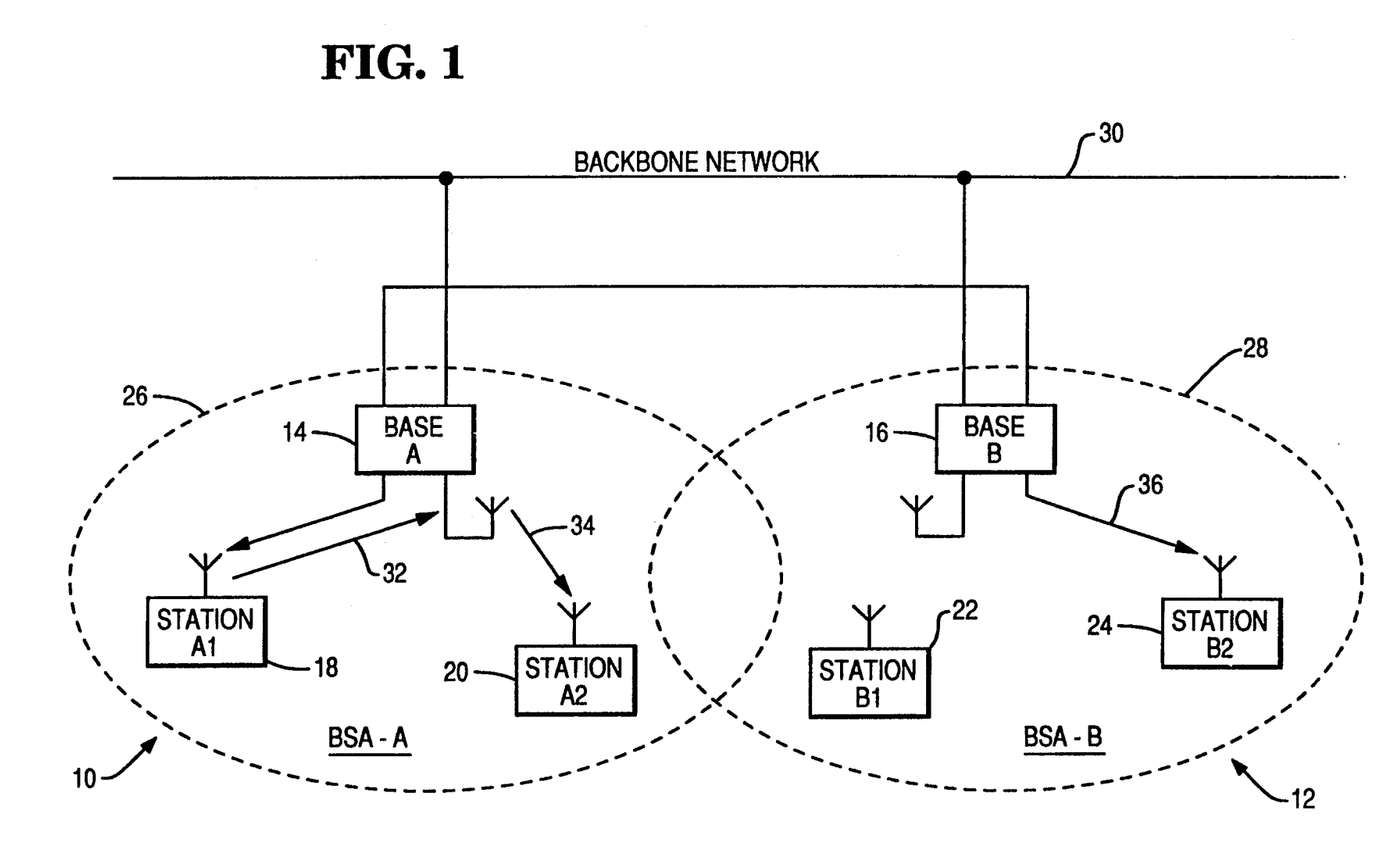
FIG. 1 illustrates a LAN structure in which the method of the present invention is employed.

The invention is now described with reference to a wireless LAN. FIG. 1. Shows two such wireless LANs 10, 12 each including a base station 14, 16 and two communication stations 18, 20; 22, 24. Each LAN is provided within a respective Basic Service Area (BSA) 26, 28 and the base stations 14, 16 of each network 10, 12 are connected to a backbone network 30 so that stations in different BSAs can communicate with each other. For example, traffic from the station 18 is directed 32 to the base station 14, and the base station 14 can then forward 34 to the traffic to the station 20 in the same BSA 26 or, if required, it can forward the traffic via the backbone 30 to the base station 16 in the BSA 28 which then forwards 36 the traffic to the station 24. The different BSAs use different radio channels. The timing synchronization provisions are outlined below with reference only to the LAN 10.

The communication stations 18, 20 in the BSA 26 are synchronized to the base station 14 by maintaining a Traffic Indication Message (TIM) interval timer which is synchronized at the receipt of periodic TIM packets from the base station 14. In the communication stations 18, 20, the timer is used to predict when the next TIM packet is expected from the base station. Thus, the communication stations 18, 20 can predict when isochronous traffic might occur and so can operate accordingly to prevent traffic collisions.

Figure 2:
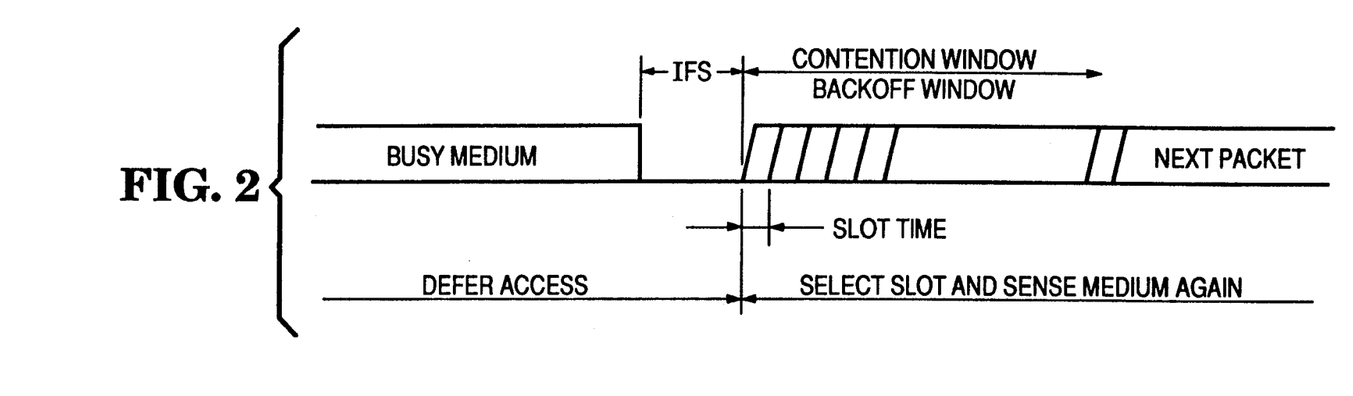
FIG. 2 is a timing diagram of a Carrier Sense Multiple Access with Collision Avoidance (CSMA/CA) access protocol.

The stations 14, 18, 20 follow a CSMA/CA access protocol before transmitting a packet and this protocol is illustrated further in FIG. 2.

When a station 18 wants to transmit a packet, it first senses the medium for activity. If the medium is found to be busy, the station 18 will wait until the medium is found to be free. After an Inter-Frame-Space (IFS), the station 18 will commence a backoff procedure whereby the station 18 again senses the medium but only after a delay of a random number of timing slots. The random delay occurs during a contention window so that the likelihood of collision between transmissions from a plurality of stations waiting for the medium to become empty is significantly reduced. To further improve the reliability, the stations are arranged to send an acknowledgment (ACK) packet each time they correctly receive a transmission from the transmitting station. The ACK packet transmission can be started after a small window (IFS in FIG. 2 or AckIFS in FIG. 3) that follows the transmission which caused the medium to be sensed as busy and so a CSMA procedure is not necessary for the ACK packet. According to the procedure, no other stations can access the medium within the period AckIFS, so no medium busy sensing needs to be done before transmitting an ACK. If an ACK packet is not received, the transmitting station recognizes that the packet it sent was not received and can attempt a re-transmission after a random backoff period.

Figure 3:
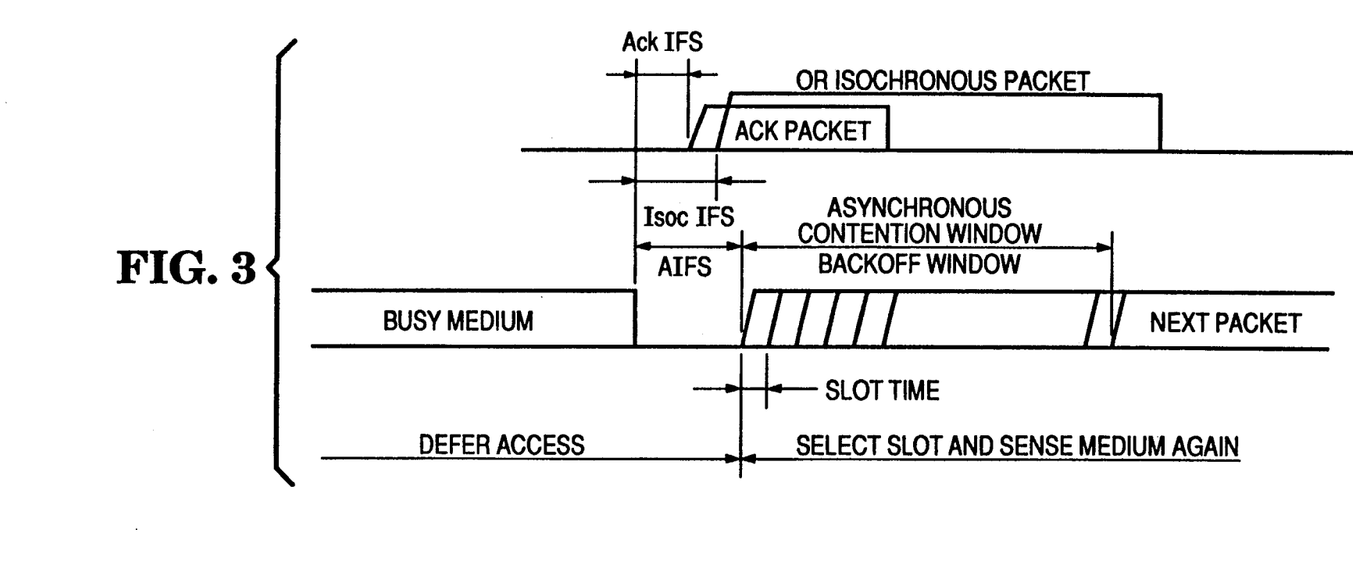
FIG. 3 is a timing diagram of the CSMA/CA protocol of FIG. 2 as employed in the present invention.

The provision of an IFS before a station commences its random backoff procedure is an important feature for assigning different priorities to asynchronous and isochronous packets. As can be seen in FIG. 3, a station that intends to transmit asynchronous traffic is arranged to commence its contention window after an Asynchronous Inter-Frame-Space (AIFS), whereas a station that intends to transmit isochronous traffic can access the medium after a delay of IsocIFS, and as mentioned above, an ACK packet can access the medium after a delay of AckIFS.

As can be seen from FIG. 3, the delay gaps for the ACK packet, the isochronous packet and the asynchronous packet are related as follows:

AckIFS < IsocIFS < AIFS

The above relationship determines that an ACK packet has the highest medium access priority of the three while an asynchronous packet has the lowest priority medium access of the three, and so collisions between the three types of packets will not occur.

With reference to the stations in the LAN 10 in FIG. 1, the TIM interval timer running in the base station 14 can also be used to generate frame periods whereby the TIM interval is an integer multiple of the frame period, The frame periods generated in the base station 14 are used to control the relative timing of the asynchronous and isochronous traffic on the medium in the BSA 26.

Figure 4:
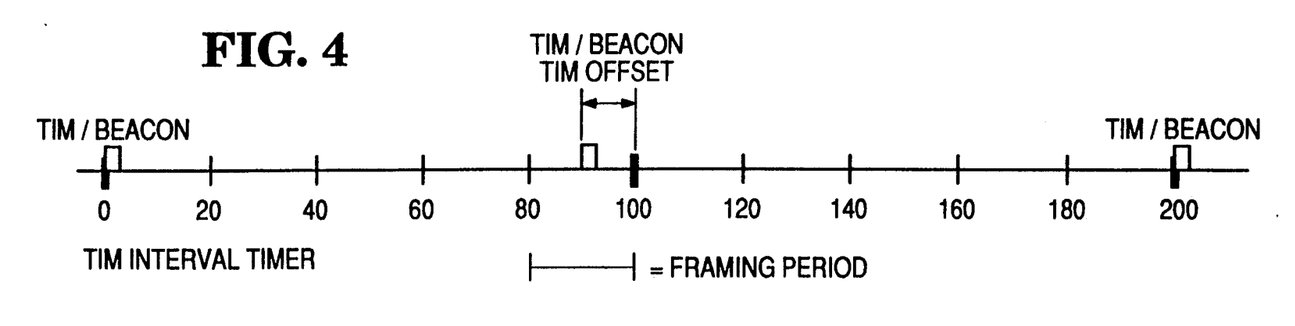
FIG. 4 is a timing diagram of a base station of a LAN employing the method of the present invention.

FIG. 4 is a timing diagram showing the relationship between the frame periods and TIM intervals generated by the timer in the base station 14. In this example, the duration of each frame period is 20 msec and the duration of the TIM interval is 100 msec. A Beacon signal is also shown in FIG. 4 and this is discussed below with reference to FIG. 5 and FIG. 8.

Figure 5:
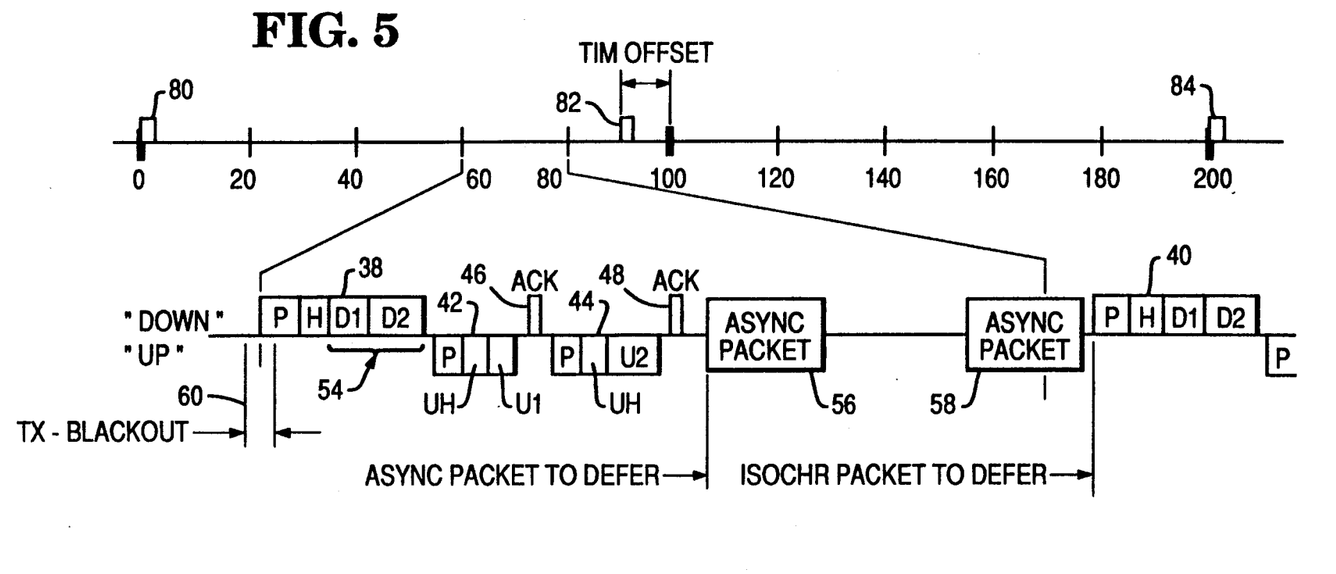
FIG. 5 is a timing diagram illustrating a first embodiment of the present invention.
Figure 8:
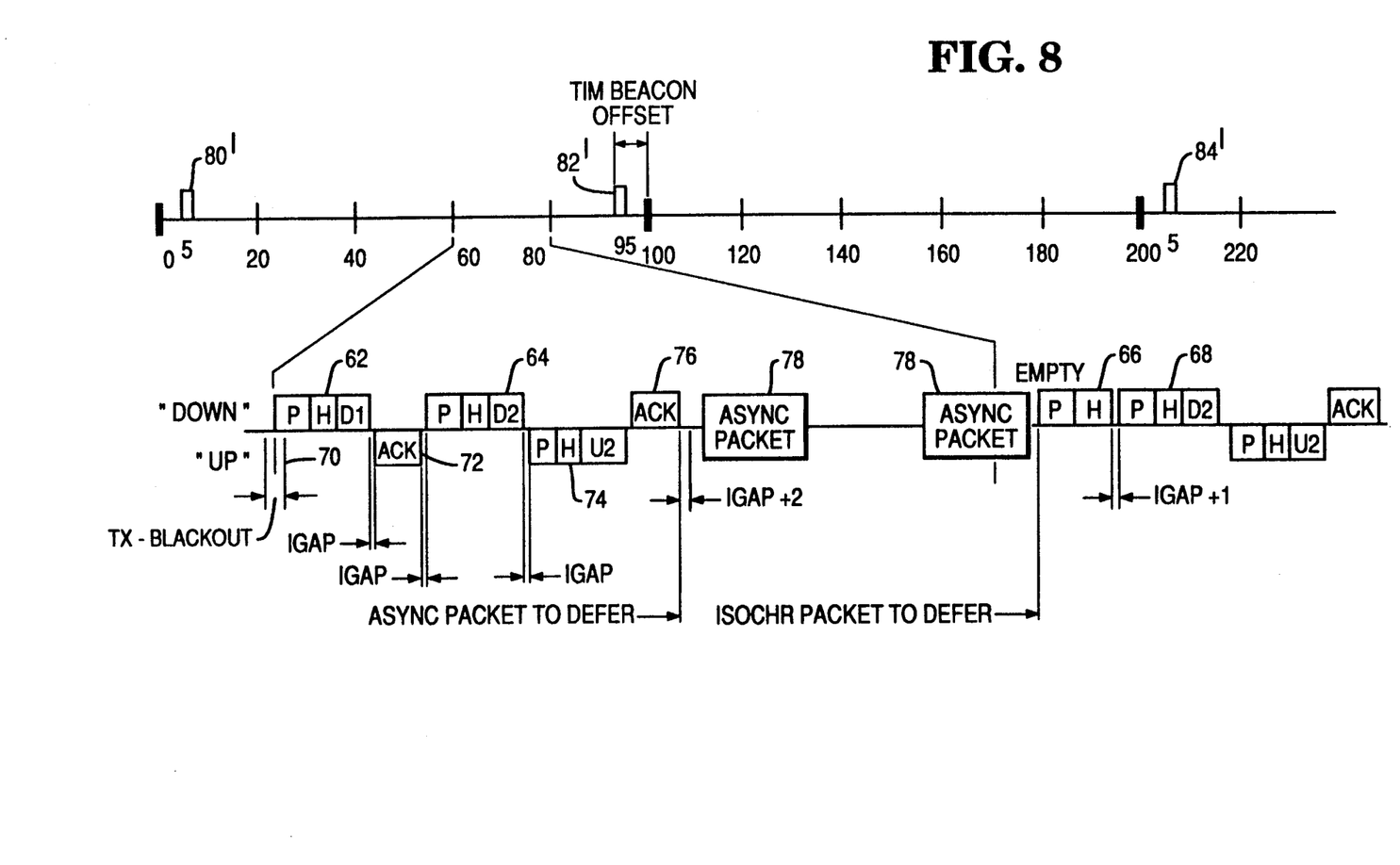
FIG. 8 is a timing diagram illustrating a second embodiment of the present invention.

With reference to FIGS. 5 and 8, it should be noted that:
P = Preamble
H = Header
Dx = Down data; and
Ux = UP data.

FIG. 5 illustrates a first embodiment of the present invention and shows the communication traffic that occurs in the timing diagram of FIG. 4 in the 60-80 msec frame period and in the start of the 80-100 msec frame period. In FIG. 5, traffic from the base station 14 to the communication stations 18, 20 is referred to as DOWN traffic and traffic from the communication stations 18, 20 to the base station 14 is referred to as UP traffic. In this first embodiment a single isochronous DOWN packet 38, 40 is sent in each frame period. The DOWN packet 38, 40 is sent once the medium is sensed as free and this packet 38, 40 employs the CSMA/CA protocol to access the medium with the isochronous priority. The DOWN packet 38, 40 carries all traffic D1, D2 from the base station 14 to the individual communication stations 18, 20 and the communication stations 18, 20 respond with individual isochronous packets 42, 44 which are individually acknowledged 46, 48 by the base station 14.

As can be seen from the timing diagram in FIG. 5, the base station 14 is triggered every frame period (20 msec) to generate the single isochronous DOWN packet 38, 40 which is received from the backbone 30 during the preceding frame period. The base station is arranged to defer any asynchronous DOWN packets pending at the beginning of the framing period so that the single isochronous DOWN packet 38 has priority over a pending asynchronous DOWN packet and is therefore transmitted before a pending asynchronous DOWN packet. Thus, with a pending asynchronous DOWN packet deferred, and the medium sensed as clear at the beginning of the period, i.e. at the 60 msec mark in FIG. 5, the base station 14 accesses the medium after its access delay (IGap+1 in FIG. 3) and transmits the DOWN packet 38.

Figure 6A:
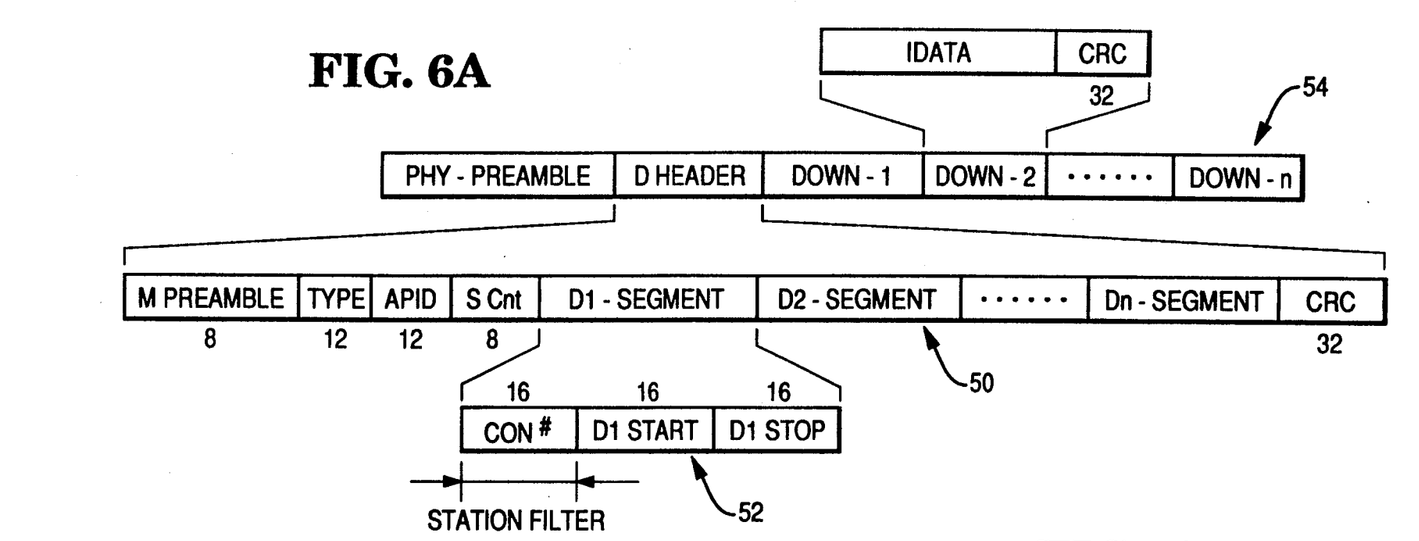
FIGS. 6A and 6B illustrate isochronous packets according to the method illustrated in FIG. 5.
Figure 6B:
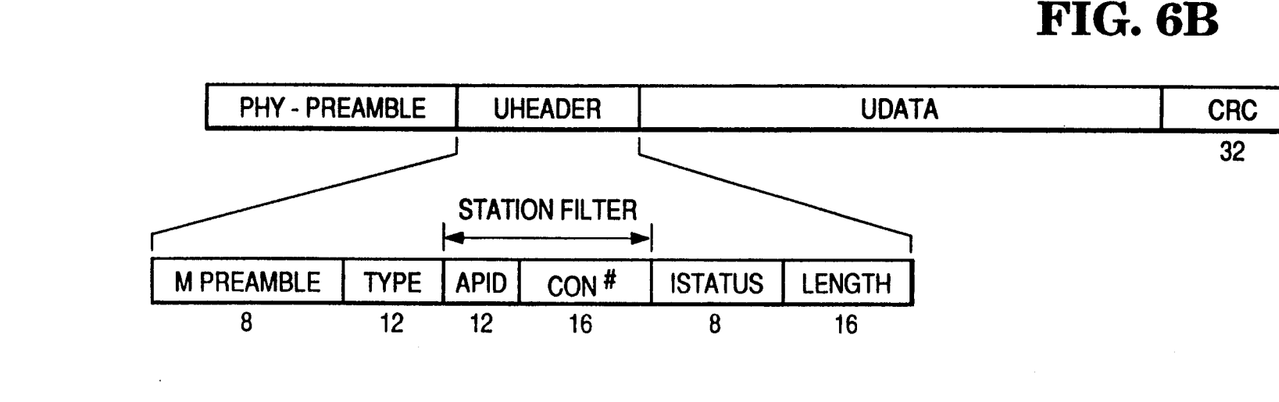

As can be seen in FIG. 6A, the DOWN packet 38 includes a header 50 that contains the information necessary for addressing the communication stations which are to receive the isochronous traffic, and that also indicates at 52 which parts of the DOWN packet 38 contain data 54 for the particular stations. The DOWN packet 38 contains the data 54 for the communication stations in a specific order and the communication stations are arranged to respond in the same order immediately after the DOWN packet 38 has ended. The responding UP packets 42, 44 (an example of which is shown in FIG. 6B) from the communication stations contain at least an acknowledgment of the respective DOWN data 54 and if the communication stations have isochronous UP traffic then this is transmitted along with the acknowledgment. The accessing of the medium by the communication stations is controlled from the base station in the BSA by way of the information in the DOWN packet.

The communication station that is first in line to transmit its UP packet 42, once transmission of the DOWN packet 54 has ended, waits for a minimum access delay gap after the end of the DOWN packet 54 before accessing the medium. The communication station that is second in line waits for a period of the minimum delay gap plus one slot delay before accessing the medium and the slot delay corresponds to the time in which the preceding station in the sequence transmits its isochronous UP traffic. Accordingly, each communication station in this first embodiment of the invention that is waiting to transmit an isochronous UP packet exhibits an access delay of the minimum gap plus n−1 slots, where n is the position of the communication station in the sequence, which position corresponds to the position of the data D1, D2 for that station in the DOWN packet 38. In this manner, the communication stations access the medium to transmit their isochronous packets 42, 44 without contention because the different slot delays prevent collision between the isochronous UP packets 42, 44.

A base station, or communication station, that has asynchronous traffic to send, or that is arranged to communicate by way of asynchronous traffic, in the first embodiment of the invention, monitors the medium and interprets the isochronous DOWN packet 38 so as to determine how many isochronous communication stations are addressed and thus how many isochronous UP packets 42, 44 will be produced in the frame period. The stations with asynchronous traffic can then adjust their AIFS delays to delay commencement of their contention windows to not less than the minimum gap plus m slots, where m is the number of isochronous UP packets 42, 44 that are to be transmitted. Thus, an asynchronous contention window does not then overlap with any of the isochronous access delay windows. A further advantage arises if the backoff algorithm for asynchronous traffic is adapted such that its contention window does not increase exponentially each time the asynchronous traffic is deferred for isochronous traffic.

The isochronous DOWN and UP packets 38, 42, 44 are not required to have a set length and, as mentioned above, when no isochronous UP data is available for transmission, only a small acknowledgment will be sent from the communication stations but only if there was DOWN traffic sent to that station. This allows for a particularly efficient use of the medium because bandwidth is not wasted when no data is to be transmitted, for example with VOICE traffic during the silent periods of a conversation. This increases the bandwidth available for the asynchronous traffic and so increases the transmission speed of the asynchronous traffic. As seen in FIG. 5, once a first asynchronous packet 56 has delayed its contention window for the minimum gap plus m slots, as mentioned above, the packet 56 is transmitted and can be followed by a further asynchronous packet 58 if that frame period has not ended. As seen in FIG. 5, the packet-transmission situation at the 80 msec mark is different from that at the 60 msec mark in that the medium is busy with asynchronous traffic, namely the packet 58. Thus, unlike the first isochronous DOWN packet 38 in the 60 msec-80 msec frame period, the first isochronous DOWN packet 40 in the 80 msec-100 msec frame period has to wait for the medium to clear before is can be transmitted. However, once the medium becomes clear in the 80 msec-100 msec frame period, the isochronous DOWN packet 40 accesses the medium with a higher priority (i.e. shorter access delay) than any pending asynchronous traffic as mentioned above (except for the ACK of the asynchronous packet).

The high priority of the isochronous DOWN packet 38, 40 in the frame period is further enhanced by the provision of a transmission blackout period 60 which occurs at each frame period boundary. During this blackout period 60, the communication stations are prevented from accessing the medium so as to prevent a collision between asynchronous UP traffic from the communication stations and the isochronous DOWN packet 38, 40 from the base station. Since the base station transmits either its isochronous DOWN traffic or its asynchronous DOWN traffic, the provision of the blackout period 60 effectively eliminates the possibility of any collision between the isochronous DOWN packet 38, 40 in each frame period and any asynchronous traffic. Collision avoidance is particularly important for this embodiment of the invention because the single isochronous DOWN packet per frame period contains all the isochronous data D1, D2, for the communication stations in that frame period and so a collision could lead to the loss of all the isochronous DOWN traffic.

Although the invention provides for integrated asynchronous/isochronous medium access with effectively no likelihood of a collision occurring between asynchronous and isochronous packets, communication failure may still occur, for example due to co-channel interference by another system using the same channel frequency. If this other system also carries isochronous traffic, then the failure probability may be high, depending on the relative frame-period timing phase and isochronous load.

Failure detection is carried out directly at the medium access level by an acknowledge means. As such, each isochronous UP packet is arranged to include an acknowledgment status relating to the proceeding isochronous DOWN packet when the corresponding DOWN segment in the DOWN packet contains data, and the base station is arranged to generate an acknowledgment for each UP packet that contains UP data and that is received successfully.

The failed packet can be recovered by retransmission once failure has been detected.

The individual failed DOWN and UP packets in each frame period can be recovered by employing an asynchronous access protocol until the frame period ends. Thus, when no acknowledgment is received after a DOWN or an UP packet, the packet is retransmitted after a random backoff period and after an asynchronous access protocol has been followed. Also, in a situation where a communication station receives a packet having a header with a CRC error, the communication station will not be able to respond and will not know where the data intended for it is located in the DOWN packet. If the communication station has pending isochronous UP traffic to send, then it generates its own isochronous packet and accesses the medium by way of an asynchronous protocol. The header 50 and data 54 of the DOWN packet are each protected by a separate CRC field, so that an error in one field does not effect the traffic for the other stations. As mentioned above, the recovery procedure is such that the recovery action in each frame period is terminated by the end of the frame period, or when the next isochronous DOWN packet is transmitted, because the failed packet will then have become obsolete.

As an alternative, the unacknowledged packets can be recovered using an isochronous protocol which occurs with high priority after the failed isochronous traffic burst. As such, the data segments 52 that are not acknowledged are introduced into a RECOVERY DOWN packet that is transmitted by the base station immediately following the last in the sequence of isochronous UP packets. Unacknowledged isochronous UP packets are recovered by re-transmission, after the last in the sequence of isochronous UP packets, and with the same high access priority as that last UP packet. If a communication station does not receive proper header 50 information, and it has an isochronous UP packet to transmit, it transmits the packet after the last isochronous UP packet in the sequence. As mentioned above with reference to the asynchronous recovery procedure, an attempted isochronous recovery should be abandoned by the frame period in which its occurs.

Figure 7A:
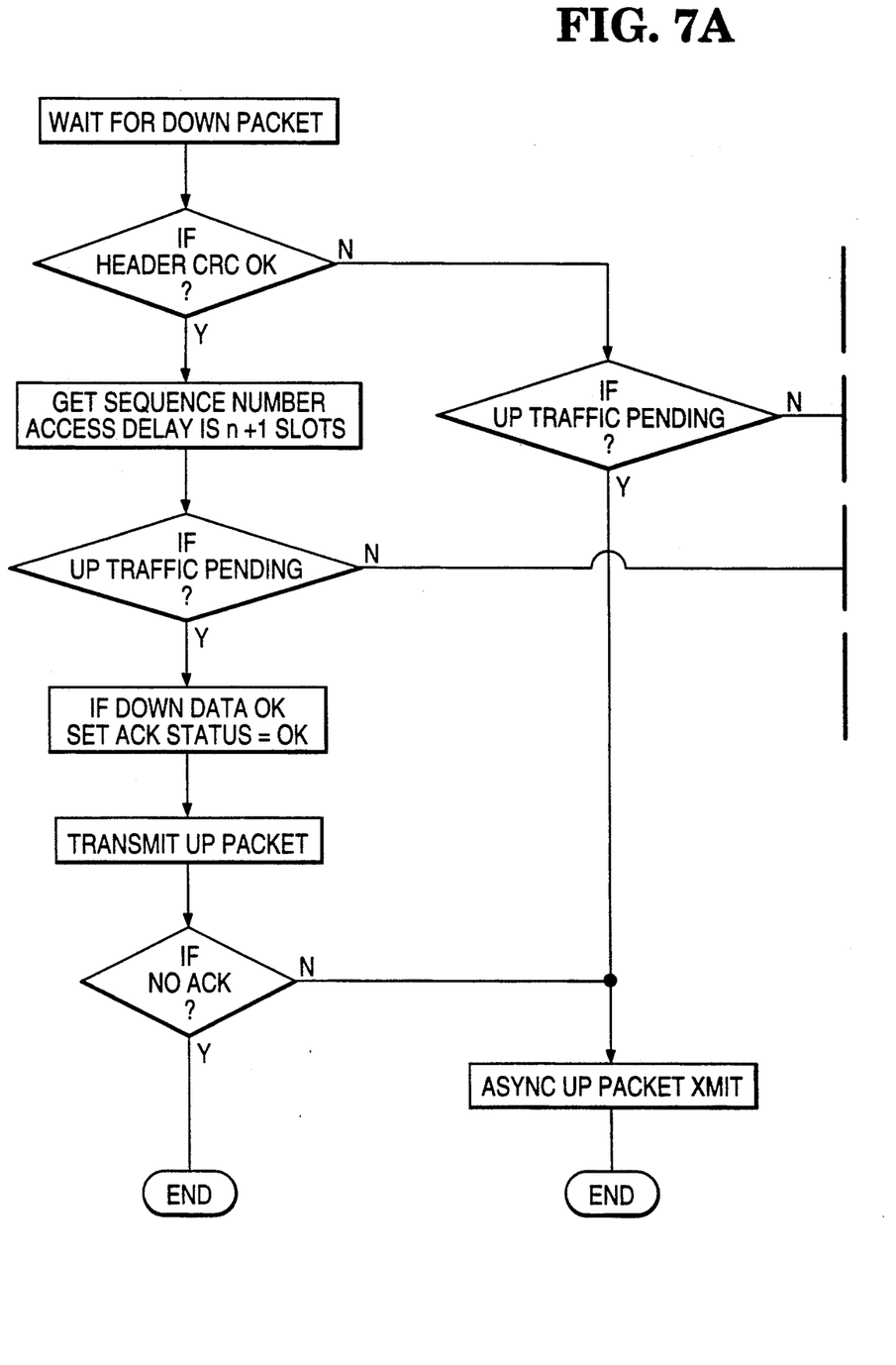
FIGS. 7A, 7B and 7C illustrate the operation of the first embodiment of the present invention, with FIGS. 7A and 7B representing a flow diagram of an isochronous station transmitter in accordance with the present invention, and FIG. 7C representing a flow diagram of an isochronous station receiver in accordance with the present invention.
Figure 7B:
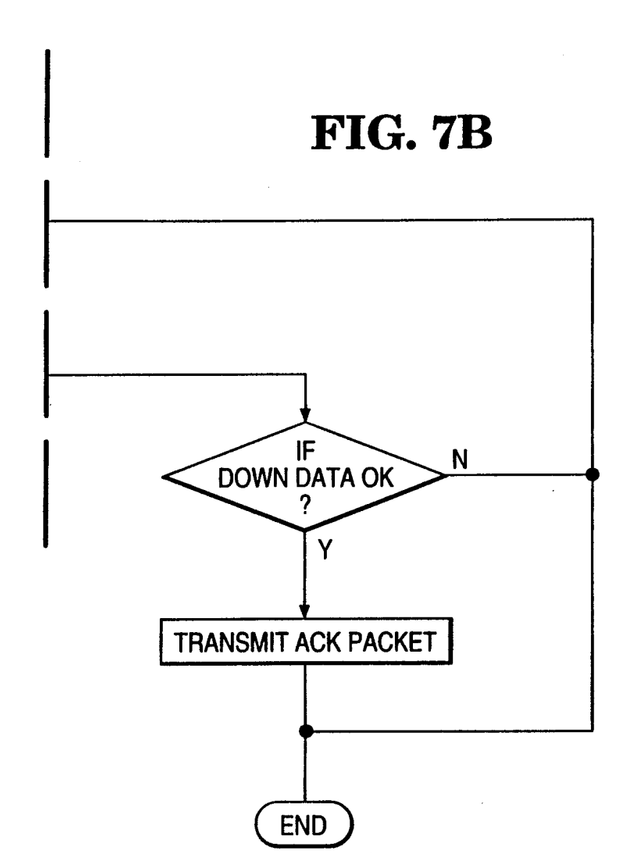
Figure 7C:
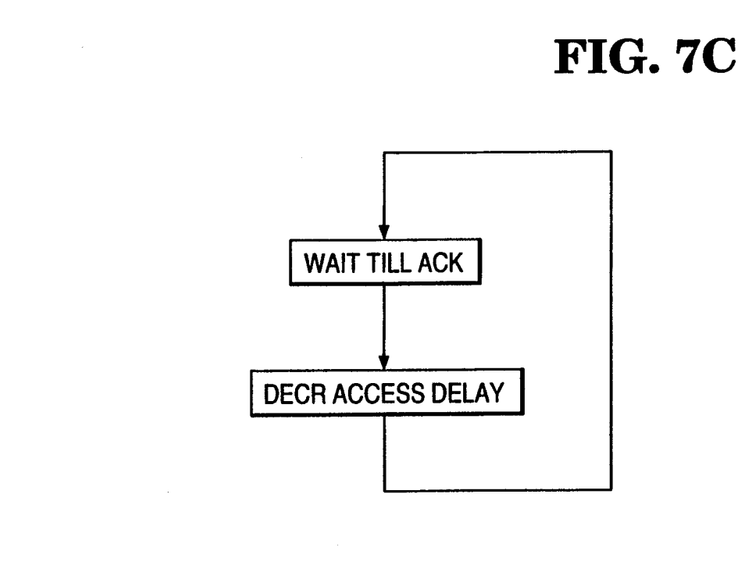

The first embodiment of the present invention is further illustrated in the flow diagrams of FIGS. 7A, 7B and 7C which shows only the operation of a communication station.

FIG. 8 is a timing diagram of a second embodiment of the present invention which is based on a simpler scheduling arrangement for the isochronous UP packets in each frame period. As can be seen, the FIG. 8 timing diagram is similar to the FIG. 5 diagram in that TIM intervals of 100 msec are provided along with frame periods of 20 reset. Again the frame period between 60 msec and 80 msec is illustrated in further detail along with the first part of the period between 80 msec and 100 msec.

The main difference from the first embodiment is that the method illustrated in FIG. 8 involves the generation and transmission of separate isochronous DOWN packets 62, 64, 66, 68 in each frame period for each station which is active for isochronous communication. As can be seen from the isochronous DOWN packet 66, a DOWN packet is also transmitted even when there is no down data for a station in the sequence, i.e. no D1 frame in the packet 66.

With reference to frame period 60 msec to 80 msec, the first isochronous DOWN packet 62 accesses the medium with a high priority compared with asynchronous traffic which, as with the first embodiment is controlled by the base station and also the provision of a transmission blackout period 70 at the frame period. The communication station that is addressed by the first isochronous DOWN packet 62 in this example does not have any isochronous UP traffic to send and so merely issues an acknowledgment packet 72 of the first packet 62 (but only when the DOWN packet contains data as in the example given). The acknowledgment packet 72 accesses the medium with a high priority, i.e. after a small access delay AckIFS (IGap). After the base station receives the acknowledgment packet 72, it transmits the isochronous DOWN packet 64 for the next station. Unlike the station that received the first isochronous DOWN packet 62, the station that receives the second isochronous DOWN packet 64 has isochronous UP traffic to transmit and it does this by way of an UP packet 74. The isochronous UP packet 74 accesses the medium with a high priority delay gap (IGap) and also contains an acknowledgment of receipt of the preceding isochronous DOWN packet 64. The last isochronous UP packet from a communication station is acknowledged by a packet 76 from the base station. The isochronous DOWN packet will also contain an acknowledgment of the preceding isochronous UP traffic.

Referring to the first part of the frame period 80 msec to 100 msec, when a communication station does not respond immediately with an acknowledgment or UP packet, the base station will generate the next isochronous DOWN packet in line after an additional slot delay. Thus, since the first isochronous DOWN packet 66 in frame period 80 msec to 100 msec was empty, and the first communication station in line to receive that DOWN packet does not have an isochronous UP packet to send, the base station transmits its next isochronous DOWN packet after a delay of IGap+1 slot. Any asynchronous traffic is arranged to have an access delay of at least IGap+2 slots so that once the first isochronous DOWN packet in the frame period has accessed the medium, the IGap, and IGap+1 slot delays allow for the completion of the isochronous communication in the frame period before asynchronous traffic 78 can access the medium after its longer IGap+2 slot access delay.

Figure 9:
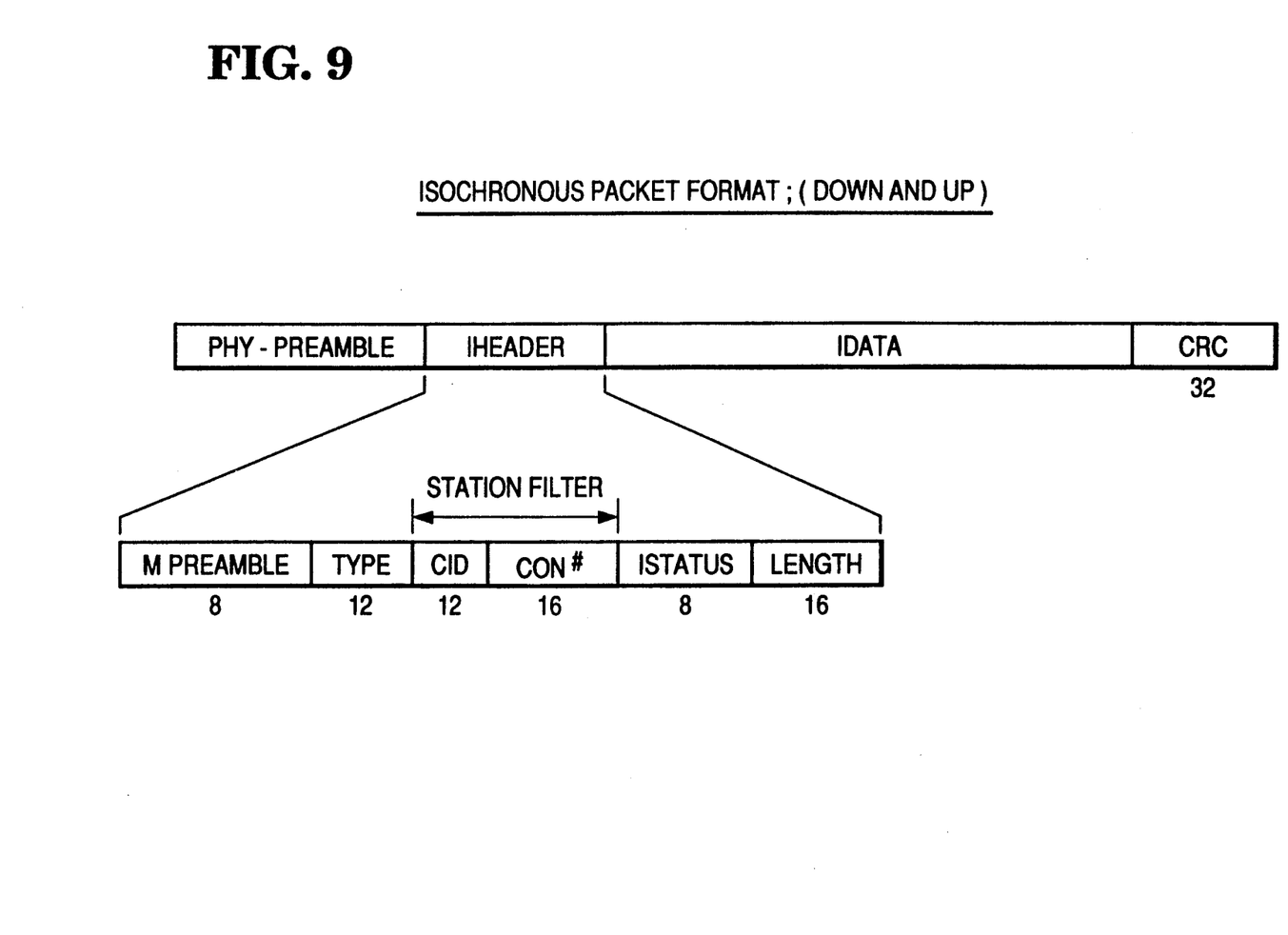
FIG. 9 illustrates an isochronous packet according to the method illustrated in FIG. 8.
Figure 10A:
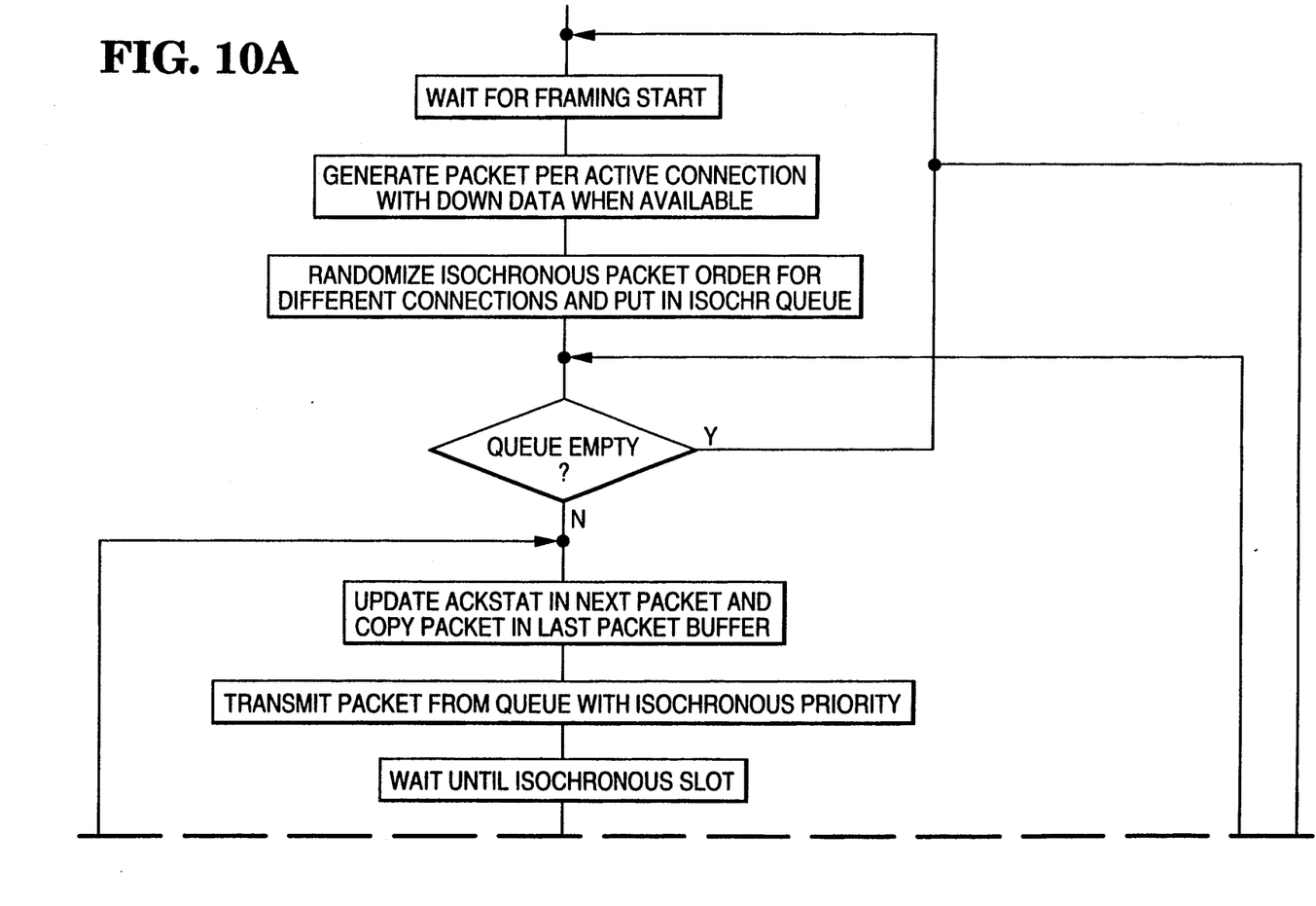
FIGS. 10A, 10B, 10C, 10D, 10E and 10F illustrate the operation of the second embodiment of the present invention, with FIGS. 10A, 10B and 10C representing a flow diagram of an isochronous access point transmitter in accordance with the present invention, and with FIGS. 10D and 10E representing a flow diagram of an isochronous station transmitter in accordance with the present invention, and further with FIG. 10F representing a flow diagram of an isochronous station receiver in accordance with the present invention.
Figure 10B:
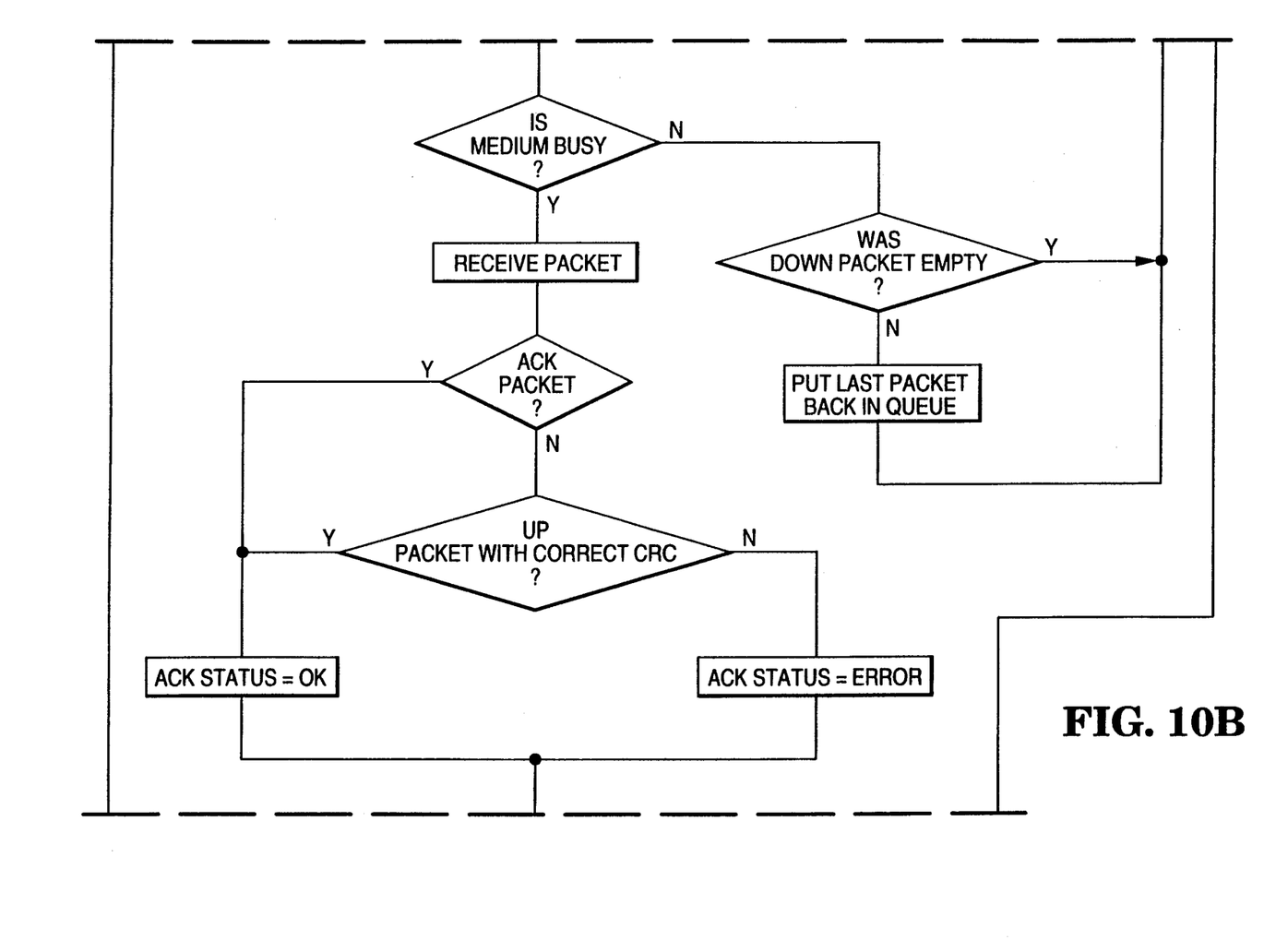
Figure 10C:
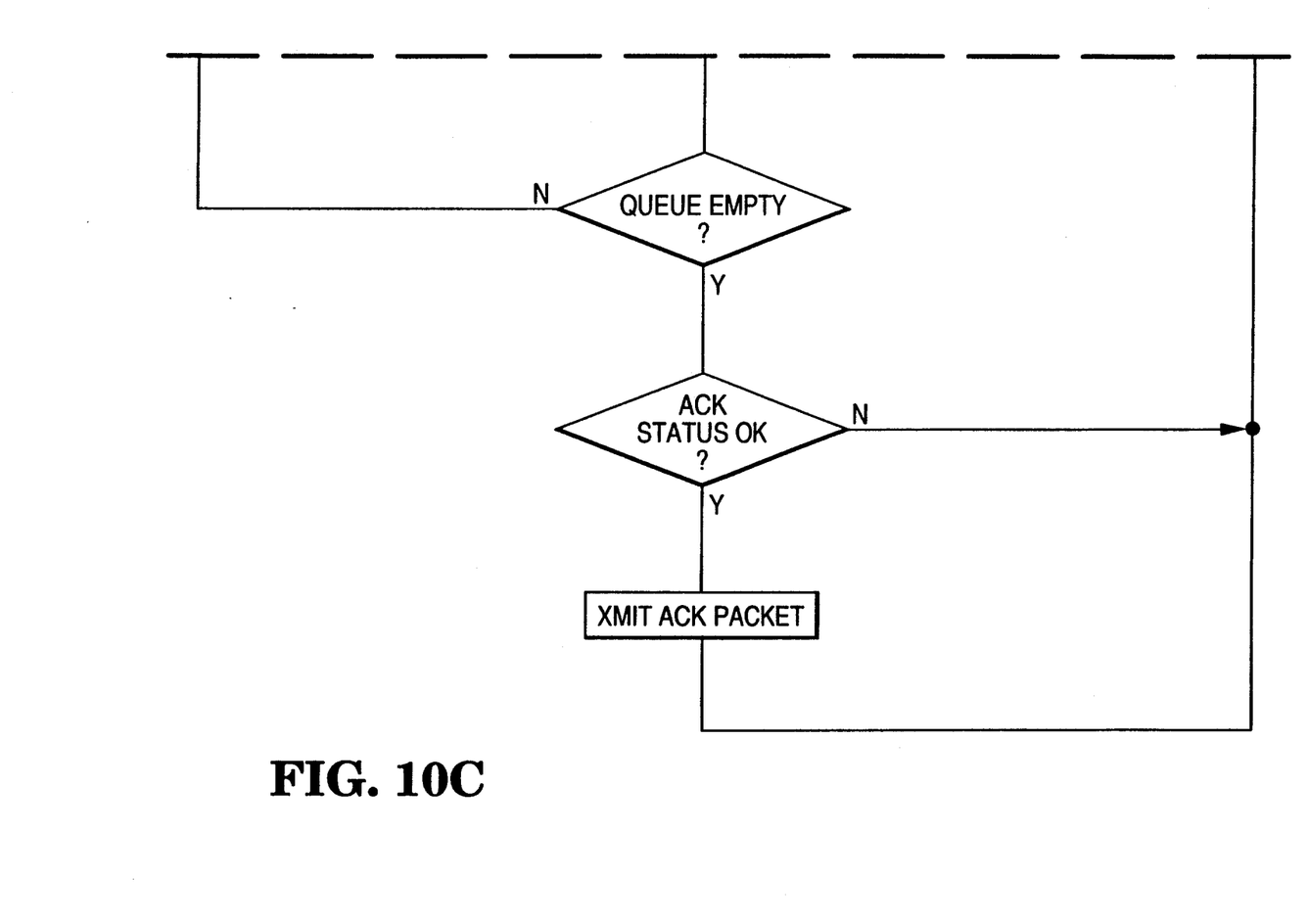
Figure 10D:
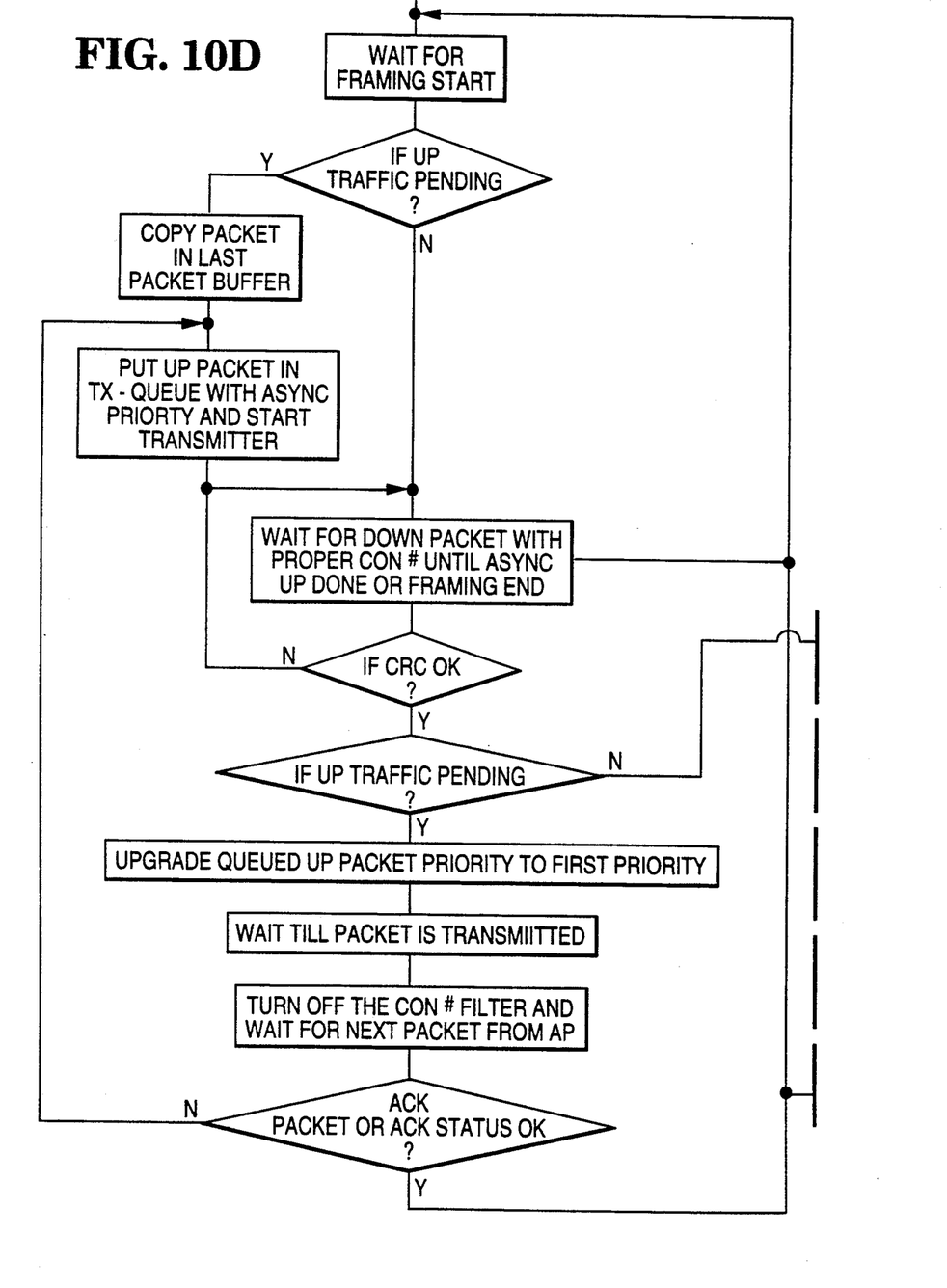
Figure 10E:
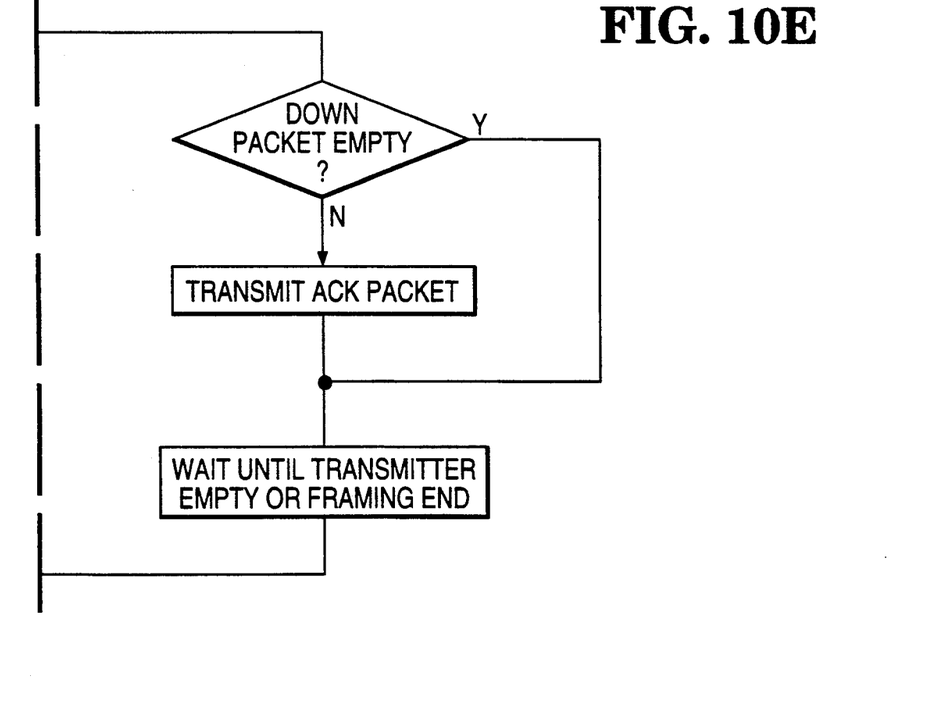
Figure 10F:
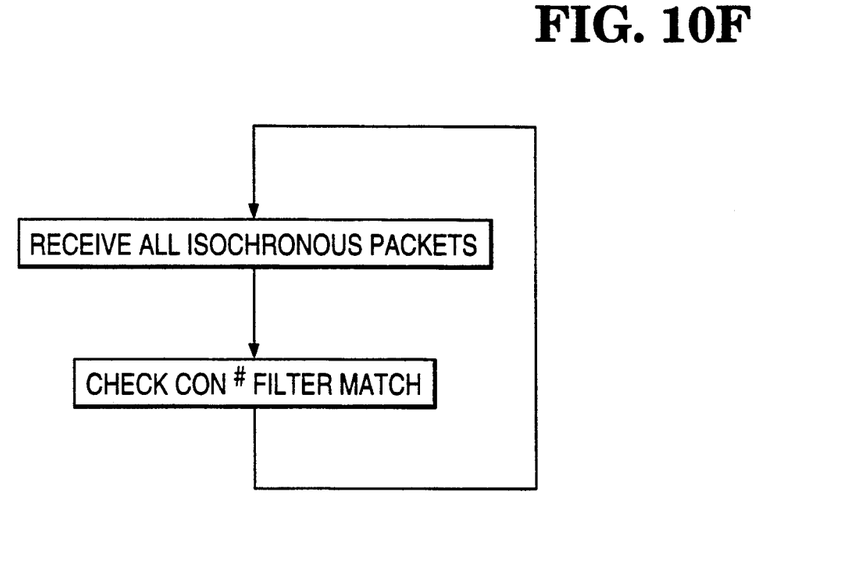

The second embodiment of the present invention is particularly advantageous in that the communication stations can access the medium with the same priority rather than with the different priorities that arise due to the "minimum gap+(n−1) slots delay" that occurs in the first embodiment. In addition, the asynchronous stations do not need to know that isochronous traffic is being transmitted. Also, the isochronous DOWN and UP packets can have the same packet format as illustrated in FIG. 9 in which:

"Con#" is a connection number that is used to address the target communication station in a DOWN packet or identify the source communication station in an UP packet;

"Type" is an identification of the traffic as isochronous;

"IStatus" is an isochronous status byte that contains an acknowledgment status for the previously received packet; and "CID" comprises a cell identification.

The second embodiment of the present invention also includes a recovery procedure for failed packets. A base station can recover a non-empty isochronous DOWN packet at the end of the isochronous access sequence by simply retransmitting the packet again but without any backoff delay and so with full isochronous access priority. The communication stations are arranged to recover from two error conditions. Firstly, when an empty isochronous DOWN packet has not arrived and secondly when an acknowledgment of the communication station preceding UP packet has not arrived. To recover from both situations, the communication station is arranged to access the medium, to retransmit the packet, after a high priority random backoff delay similar to that employed for asynchronous traffic.

The second embodiment of the present invention is illustrated further in FIGS. 10A, 10B, 10C, 10E and 10F.

As can be seen in FIGS. 5 and 8, the TIM interval timer in the base station also controls the generation of a series of beacon signals 80, 82, 84 and 80', 82', 84' which allow for the mobility of a communication station, for example the station 18 in FIG. 1, between different BSAs 26, 28 forming an Extended Service Area (ESA). The station 18 monitors other available channels, or a so-called acquisition channel, to determine if a better connection than its present connection is available to a base station in another BSA within the ESA. Each base station 14, 16 generates a beacon signal 80, 82, 84; 80', 82', 84', on the acquisition channel so that the mobile stations can recognize which base station provides the strongest signal. The beacon signal 80, 82, 84; 80', 82', 84', also contains information identifying the channel used by the base station from where it is transmitted. The station 18 can only monitor the acquisition channel during quiet periods in each frame period and has to tune-back to the current channel just before the next frame period is expected so as to receive the next isochronous DOWN packet.

As can be seen from FIGS. 5 and 8, the beacon signals are sent at a different phase with respect to the TIM signals so that the beacon signals have an improved probability of being heard. In FIG. 5, the beacon interval is the TIM interval± half a frame period, whereas in FIG. 8, the beacon interval is the TIM interval± a quarter of a frame period.

The time available for each communication station to scan the acquisition channel depends on the number of stations that are active for isochronous communication in each frame period, and therefore depends on the number of active isochronous channels. Since, in FIG. 5, the stations are accessed in a particular order that corresponds to the order of the data 54 in the down packet 50, and as shown in FIG. 8 the stations are accessed in an order corresponding to the order of the separate isochronous DOWN packets 62, 64 for each station, the communication station that is addressed first then has more time to monitor the acquisition channel than the station that is addressed last. In order to average out the time available for each station, the position of the data for a particular station in the single DOWN packet (FIG. 5) or the position of the separate DOWN packet for that particular station (FIG. 8), is randomized each frame period. For example, if eight communication stations are active for isochronous traffic each frame period, the randomization of the order determines that, on average, each station will be fourth in line to receive the data intended for it and to transmit an isochronous UP packet in response. Thus, on average, all the eight stations have a similar time available to monitor the acquisition channel during a series of frame periods. Alternatively, stations can decide to go into sleep mode until the next frame period arrives.

From the above, it can be seen that the present invention advantageously provides for an integrated asynchronous/isochronous medium access protocol which effectively prevents a collision between asynchronous and isochronous traffic. Also, the packet length can be varied as required and any bandwidth unused by the isochronous traffic can be employed for the asynchronous traffic.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of accessing a communication medium of a local area network for isochronous and asynchronous communication between a plurality of communication stations which communicate by way of a base station, comprising the steps of:

generating uniform timing periods in said base station;

accessing the medium each period with at least one isochronous packet from the base station With a higher access priority than any asynchronous packets pending at the commencement of each timing period;

delaying any asynchronous packets in each timing period until the at least one isochronous packet and any isochronous traffic transmitted in response thereto have attempted access to the medium; and accessing the medium for transmission of the asynchronous packets during the remainder of each timing period, wherein one isochronous packet is transmitted from the base station each timing period and the one packet contains all the isochronous communication data which is to be transmitted to the communication stations in that period, wherein each communication station having an asynchronous packet to transmit in a timing period receives the one isochronous packet to determine how much isochronous traffic will occur in the period and adjust its access delay accordingly.

2. A method of accessing a communication medium of a local area network having a plurality of communication stations and a base station with the base station generating a uniform timing period, comprising the steps of:

accessing the medium during the timing period with an isochronous packet from the base station which was pending at the beginning of the timing period;

accessing the medium during the timing period with an asynchronous packet from the base station which was pending at the beginning of the timing period; and providing a higher access priority to the isochronous packet than to the asynchronous packet, wherein the isochronous packet is transmitted from the base station during the timing period and includes all isochronous communication data which is to be transmitted to the plurality of communication stations during the timing period wherein one of the plurality of communication stations receives the isochronous packet and determines how much isochronous traffic will occur during the timing period and adjusts an access delay in response thereto.

* * * * *